(No Model.) 2 Sheets—Sheet 1.
F. L. FULLER.
INDICATING OR LIKE MECHANISM FOR PRICE SCALES.
No. 603,504. Patented May 3, 1898.
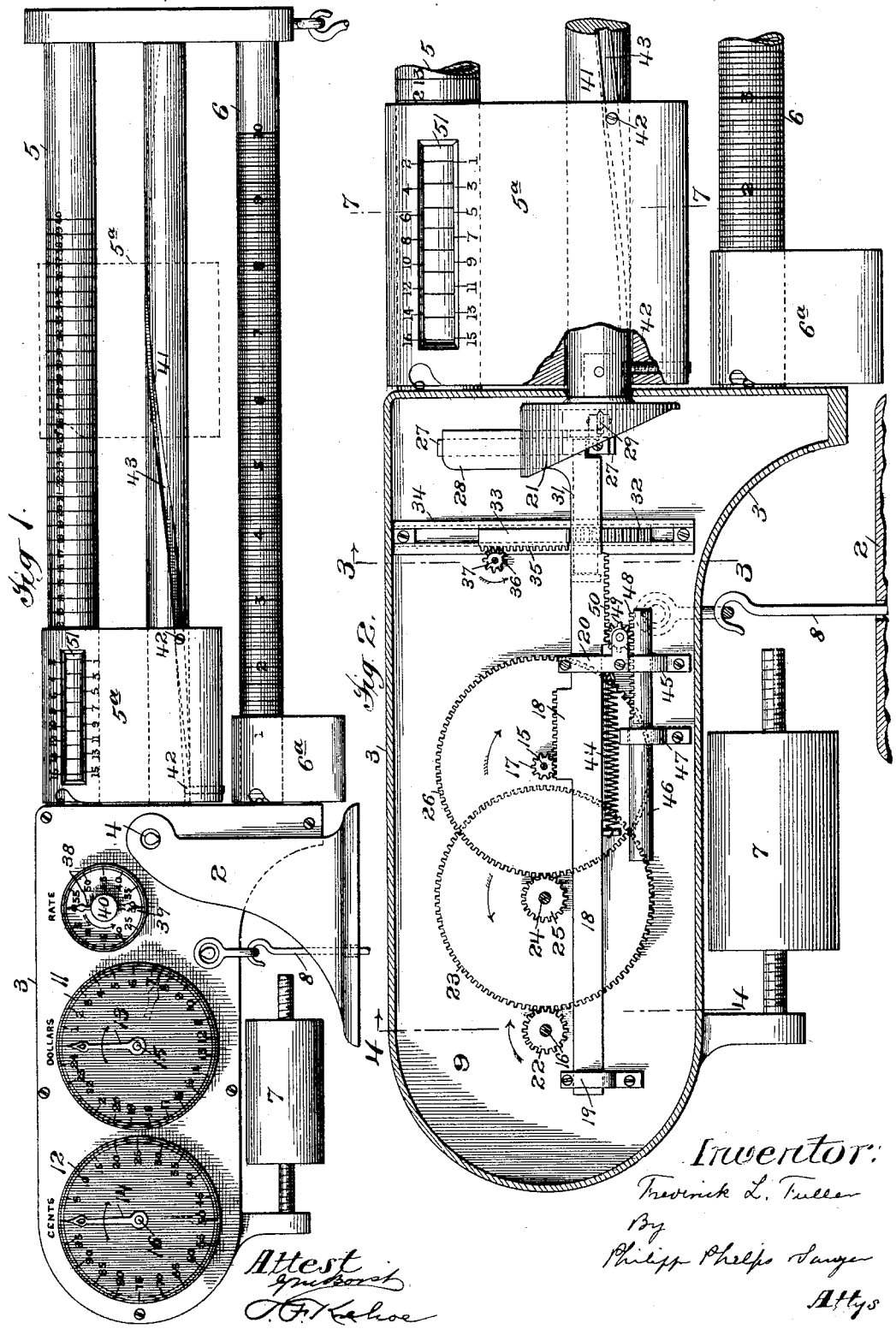
Attest:
[signatures]
Inventor:
Frederick L. Fuller
By
Philipp Phelps Sanger
Attys

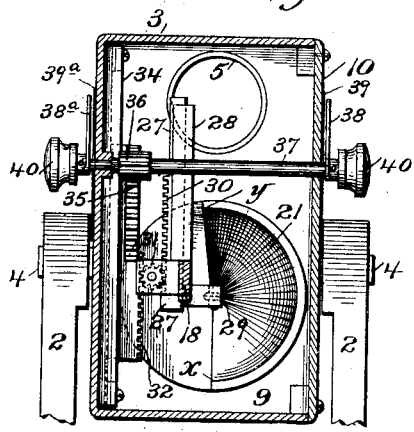
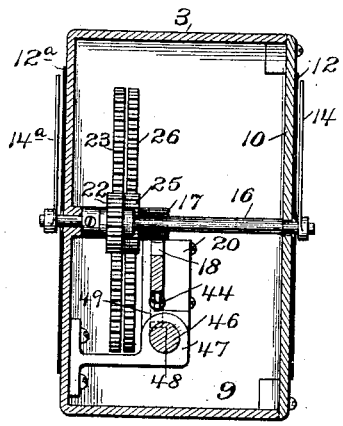
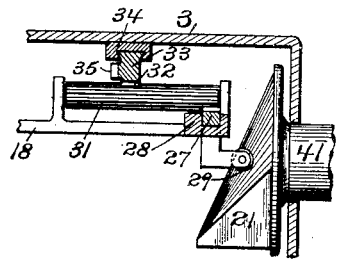
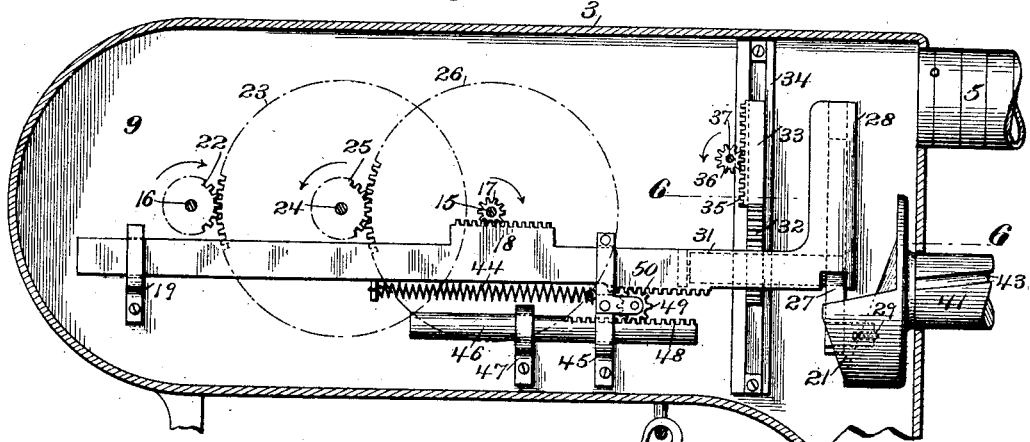

UNITED STATES PATENT OFFICE.

FREDERICK L. FULLER, OF TRENTON, NEW JERSEY.

INDICATING OR LIKE MECHANISM FOR PRICE-SCALES.

SPECIFICATION forming part of Letters Patent No. 603,504, dated May 3, 1898.

Application filed September 14, 1897. Serial No. 651,578. (No model.)

*To all whom it may concern:*

Be it known that I, FREDERICK L. FULLER, a citizen of the United States, residing at Trenton, county of Mercer, and State of New Jersey, have invented certain new and useful Improvements in Indicating or Like Mechanism for Price-Scales or other Machines, fully described and represented in the following specification and the accompanying drawings, forming a part of the same.

The invention relates to improvements in indicating mechanism designed particularly for application to weighing-scales for the purpose of indicating the price or total cost of articles weighed, it being the object of the present invention to provide mechanism of this character which shall be of simple and durable construction, having few parts, and which shall be reliable and accurate both in adjustment and in operation.

Broadly the invention consists in an indicating or like mechanism for application to price-scales and other machines comprising a rotary member and a member coacting therewith, one of said members being inclined, with its inclination varying progressively in a transverse direction, and one member being adjustable relatively to the other in such direction. When such mechanism is applied to a weighing-scale for the purpose of indicating the price of the article weighed, one of the two members will be mounted in the scale, so as to be moved relatively to the other member in accordance with the weight, so as to actuate the price-indicating devices.

In the preferred construction illustrated in the drawings and hereinafter particularly described, and which is designed particularly for application to price-scales, though capable of use in other machines employing indicating or like mechanism, the member which constitutes the actuator is the rotary member, and said member is also the one which is inclined, and said rotary member is connected to a movable part of the weighing mechanism—as, for example, the poise of a beam-scale—in such manner that upon the movement of said movable member of the weighing mechanism it will be rotated and thus actuate the other member and through it the computing mechanism, the inclination of the rotary member being such, preferably, that actuation of the other member is produced by rotary movement of the rotary member. The inclination of the rotary member in such case is concentric to its axis and varies progressively radially or transversely thereof, and the other member actuated thereby is adjustable in such direction to suit variations in the unit prices of the articles weighed for the purpose of securing actuation of the computing mechanism in accordance with such unit prices. The extent of movement of the computing mechanism in such case is dependent upon the extent of rotation of the rotary member, which in turn depends upon the extent of movement of the poise—*i. e.*, the weight of the article—and also upon the inclination of that portion of the rotary member with which the other member is in contact at the time of its rotation, which inclination represents the rate per pound.

As the improvements constituting the present invention have been designed particularly for application to price-scales, in combination with which they have peculiar advantages and will be more generally used, they have for convenience been illustrated herein and will be hereinafter described in detail in such connection, although it is to be understood that they are of general application.

In the accompanying drawings, Figure 1 is a side elevation of a scale-beam equipped with the improvements of the present invention, a small portion of the scale-frame being shown. Fig. 2 is a sectional elevation, on an enlarged scale, of a portion of the same, illustrating particularly the price-indicating mechanism. Fig. 3 is a cross-section taken on the line 3 3 of Fig. 2. Fig. 4 is a cross-section of the same, taken on the line 4 4 of Fig. 2. Fig. 5 is a view similar to Fig. 2, illustrating parts of the price-indicating mechanism in the positions they occupy after the operation of the scale in weighing and indicating the price of an article. Fig. 6 is a section on the line 6 6 of Fig. 5, and Fig. 7 is a section on the line 7 7 of Fig. 2.

The particular class of scale in connection with which the invention is illustrated in the drawings is that known as a "beam-scale," such scale being selected because the invention in the form in which it is illustrated in the drawings, which is the preferred form, is particularly applicable to scales of this class.

Referring to said drawings, 2 represents a portion of the frame of a beam-scale, and 3 its beam, which is fulcrumed at 4 and has two rods 5 6, provided with poises 5ª 6ª, respectively (the latter being a tare-poise) and graduated to represent pounds, the graduations upon the upper or main rod 5 extending up to forty pounds, while those upon the lower or auxiliary rod 6 extend to ten. Upon the opposite side of the fulcrum 4 the scale-beam 3 is provided with the usual adjusting-poise 7 and platform or pan connecting rod 8. This end of the beam 3 also, as will be observed, is formed to provide a casing or housing 9, closed by a plate 10, for receiving and inclosing working parts of the indicating devices, as will presently appear. The side of the scale-beam illustrated in Figs. 1, 2, and 5 is the attendant's side. This is the side which, for convenience, will be hereinafter particularly referred to, but, as will hereinafter appear, the indications made on this side of the scale, both as to weight, rate, and price or total cost, will be simultaneously made on the opposite or customer's side.

The indicating mechanism consists generally of indicating-dials 11 12 on the attendant's side, representing dollars and cents, respectively, with which coact pointers 13 14, respectively, the shafts 15 16 of which are journaled in the scale-beam 3. The shaft 15 of the pointer 13 is provided with a pinion 17, which is engaged by a sliding rack 18, supported in guides 19 20 in the scale-beam and adapted to be engaged and slid rearwardly by a rotary inclined member or cam 21 upon the movement of the poise 5ª, as will hereinafter appear. As the rack 18 is thus slid rearwardly it will, through the pinion 15, rotate the pointer 13 in the direction indicated by the arrow in Figs. 1, 2, and 3. The shaft 16 is also provided with a pinion 22, which is engaged by an intermediate 23, the shaft 24 of which is provided with a pinion 25, meshing with an intermediate 26, secured to the shaft 15, so that as the pointer 13 is revolved the pointer 14 will also be revolved in a like direction over the dial 12, as indicated by the arrows in Figs. 1, 2, and 5.

At its forward end the rack-bar 18 is provided with a vertically-sliding bar 27, moving in a guide 28 in the end of rack-bar 18 and provided at its lower end with an elbow carrying a roller 29, adapted to be engaged by the inclined member or cam 21 and with a rack 30, engaged by a broad pinion 31, mounted in the rack-bar 18, and by turning which the rack-bar 27 may be raised or lowered, as desired, and the roller 29 moved radially with relation to the inclined member or cam 21, as will be hereinafter described. The pinion 31 is in turn engaged by a rack 32, formed upon a vertically-sliding rod 33, mounted in a guide 34, and which is provided with a second rack 35, engaged by a pinion 36 upon a shaft 37, mounted in the beam 3, as best illustrated in Figs. 2 and 3, so that upon turning said shaft 37 the rack-bar 27, and with it the roller 29, may, through the connections just described, be moved radially relatively to the inclined member 21 into any position desired, the position to which it is adjusted representing the rate per pound of the article weighed. The shaft 37 is provided with a pointer 38, coacting with a dial 39, graduated to represent in cents the rate per pound of the article weighed, and with a handle 40. The dials 11, 12, and 39, heretofore described, are, as before stated, located on the attendant's side of the scale. For convenience similar dials are also located upon the opposite or customer's side of the scale, two of which—the cents-dial 12ª and rate-dial 39ª, with their pointers 14ª and 38ª—are illustrated in Figs. 3 and 4, so that the purchaser can readily see the rate per pound and also the price of the article weighed.

On the attendant's side of the scale, as illustrated in Fig. 1, dollars and cents are read, respectively, from right to left, but on the purchaser's side of the scale the arrangement will be reversed, the reading being from left to right.

The inclined member 21 is secured to the inner end of a rod 41, journaled in the beam 3, and which is adapted to be rotated, as the poise 5ª is moved to and from weighing position, by a pin or pins 42, carried by the poise 5ª, and which enter a spiral slot 43, formed in the rod 41. As the inclined member 21 is thus rotated it will, provided the rack-bar 27 and roller 29 have been adjusted radially with relation to it away from its center, engage said roller 29 and through it and the rack-bar 27 slide the rack-bar 18 rearwardly, thus rotating the pointer 13 and, through the intermediate 26, pinion 25, and intermediate 23, also rotate the pointer 14. The rack-bar 18 is held normally in zero position and returned to that position after each operation by a spring 44, connected to the rack-bar and to a bracket 45, secured to the casing 9.

The extent of rotation of the inclined member 21 is dependent upon the length of movement of the poise 5ª, and the extent of sliding movement given the rack-bar 18 is in turn dependent upon the extent of rotation of the inclined member 21 and also upon the position of the roller 29 relatively to the axis of rotation of said inclined member. The inclined member 21 is inclined concentrically to its axis, so as to move the rack-bar 18 a distance corresponding to the extent of its own rotation, which depends, of course, upon the weight of the article weighed, and is also inclined transversely to such movement or radially, the inclination of the member 21 thus varying progressively in a radial direction or the direction in which the roller 29 is adjustable to suit variations in the unit prices of the articles weighed. As the roller 29 is adjusted outwardly from the axis of the inclined member or actuator 21 the extent of movement of the rack-bar 18 for a given number of pounds is increased, while when it is adjusted in the opposite direction it is decreased. The face of the inclined member or actuator 21 is not entirely inclined, the inclined portion constituting a little more than one-half its face, with the lowest point of the incline at $x$ and the highest point at $y$, Fig. 3, the other portion of the face of the inclined member being plane. The inclined portion shown is sufficient in extent for the capacity (forty pounds) of the scale and for rates to sixty cents. For scales of larger weighing capacity and higher rates corresponding changes will of course be made in the inclined member.

Normally the several parts occupy the positions in which they are shown in Figs. 1 to 4—that is, with the roller 29 in line with the axis of the inclined member 21. With the parts in this position the scale may, if desired, be used simply for the purpose of weighing, the rotation of the inclined member or actuator 21, due to movement of the poise $5^a$ along the rod 5, producing no movement of the rack-bar 18 because the roller 29 is in line with the axis of the inclined member or actuator 21 and not engaged by its inclined portion. If, however, it be desired to indicate the cost of the article in addition to its weight, all that need be done is to rotate the pointer 38 in the direction indicated by the arrow, Figs. 1, 2, and 5, to the graduation on dial 39 representing the rate per pound and bring it to rest at that point. As the pointer 38 is thus rotated its shaft 37 will, through its pinion 36, raise the rack-bar 33, and the latter in turn will, through its rack 32, pinion 31, and rack 30, lower the rod 27 and with it the roller 29, the latter being thus moved radially away from the axis of the inclined member or actuator 21, along the plane portion thereof, and finally brought to rest at the base of the incline opposite that portion thereof corresponding to the rate. As the poise is then moved the inclined member or actuator, engaging the roller 29, will slide the rack-bar 18 rearwardly a distance corresponding to the extent of its rotation multiplied by the degree of inclination of that portion of it which engages the roller 29—in other words, the weight multiplied by the rate per pound or other unit. The result or total cost of the article will be indicated on the dials 11 12 on the attendant's side and simultaneously by the corresponding dials on the opposite or customer's side of the scale.

Let us assume that the unit price or rate per pound be thirty cents. The pointer 38 will be brought to rest opposite the graduation "30" on dial 39. As the pointer 38 is moved to this position the roller 29, through the connections described, will be moved radially to about the position shown in Figs. 5 and 6—that is, about midway between the axis of the inclined member or actuator 21 and its periphery. (See Fig. 6.) If the weight be twenty-five pounds, the poise $5^a$ will be moved to the position shown by dotted lines in Fig. 1. The rack-bar 18 will in such case be moved rearwardly to about the position shown in Fig. 5 and the pointers 13 14 moved to the positions in which they are shown by dotted lines, Fig. 1, indicating seven dollars and fifty cents as the total cost. If the unit price of the next sale be less than thirty cents, the roller 29 will be adjusted from its thirty-cent position inwardly toward the axis of the inclined member or actuator.

As the rack-bar 18 is moved rearwardly and away from the fulcrum 4 the weight of that end of the beam 3 is of course increased. The increase is very slight; but in some cases it might be considered desirable to offset or compensate for it in some way. For this purpose I provide a compensator 46, sliding in brackets 45 47 and provided with a rack 48, engaged by a pinion 49, mounted in the bracket 45, and which is in turn engaged by a rack 50 on the lower edge of the rack-bar 18. The result of this construction is that as the rack-bar is slid rearwardly by the inclined member or actuator 21 the compensator-bar 46 is moved correspondingly in the opposite direction—i. e., inwardly toward the fulcrum 4. As the rack-bar returns to normal position the compensator is moved in the opposite direction.

In order to obtain a large capacity in pounds on the scale-beam I preferably omit from the rod 5 ounce graduations and employ a vernier for indicating ounces. For this purpose I provide the poise $5^a$ upon each side of the scale-beam with an opening 51 52, through which may be seen the graduations upon the rod 5. At this opening I provide graduations, sixteen in number, which by movement of the poise may be made to coincide with the graduations upon the rod 5. These graduations I arrange in two rows, the lower row including the odd numbers, while the upper row includes the even numbers. The graduations on the lower row are distanced apart a space equal to one and two-sixteenths the distance between two graduations upon the rod 5, while those upon the upper row are similarly separated from each other, but lie behind those of the lower row a distance equal to one-sixteenth of a pound graduation on the rod 5. The two rows are thus staggered or the graduations of the two rows alternate—that is, when graduation "1" is one-sixteenth behind a pound graduation on rod 5 graduation "2" will be two-sixteenths behind the same pound graduation and graduation "3" will be three-sixteenths behind the next pound graduation, and so on. All that it is necessary to do, therefore, in order to ascertain the number of ounces weighed is to inspect the two rows of graduations and ascertain which one of them coincides or registers with a pound graduation upon the rod 5. In the position in which the parts are shown in Figs. 1 and 2 the poise is at zero, the vernier graduation "16" coinciding with a pound graduation on the rod 5. If the weight of the article weighed be one ounce, the vernier graduation "1" will be found to coincide with a pound graduation nearest to it in zero position, or if the weight be six ounces the vernier graduation "6," which at zero is six-sixteenths behind the nearest pound graduation, will coincide with such graduation.

As before stated, the rate and cost indications on the attendant's side of the beam are repeated on the customer's side. It is also desirable in order to complete the indications at the latter side that the weight-indications should also be repeated there. For this purpose the pound-graduations on the rod 5 run around the rod 5, the ounce-graduations being read through the opening 52 by means of the vernier on the customer's side of the beam.

I prefer to construct the scale-beam and poise as shown in the drawings—that is, by forming the main rod 5 (and also the auxiliary rod 6, if one be used) of tubing and correspondingly shaping the poise—as by so constructing them a wide and smooth bearing and at the same time a close relation of poise and beam are secured, which, while permitting ready movement of the poise manually, holds the poise steadily in position.

As before stated, the construction illustrated in the drawings embodies the invention in what is considered its preferred form. Modifications and changes may be made therein without departing from the invention.

What I claim is—

1. An indicating or like mechanism comprising a rotary member and a member coacting therewith, one of which is inclined, said members being adjustable one relatively to the other transversely to the incline and said incline varying progressively in the direction of adjustment, substantially as described.

2. An indicating or like mechanism comprising a rotary actuating member and a member actuated thereby, one of which is inclined, said members being adjustable one relatively to the other transversely to the incline, and said incline varying progressively in the direction of adjustment, substantially as described.

3. An indicating or like mechanism comprising a rotary inclined member and a member coacting therewith, said members being adjustable one relatively to the other transversely to the incline, and said incline varying progressively in the direction of adjustment, substantially as described.

4. An indicating or like mechanism comprising a rotary inclined member and a member coacting therewith and adjustable transversely to the incline, said incline varying progressively in the direction of adjustment, substantially as described.

5. An indicating or like mechanism comprising a rotary inclined actuator and a member actuated thereby, said members being adjustable one relatively to the other transversely to the incline, and said incline varying progressively in the direction of adjustment, substantially as described.

6. An indicating or like mechanism comprising a rotary inclined actuator and a member actuated thereby and adjustable transversely to the incline, said incline varying progressively in the direction of adjustment, substantially as described.

7. The combination with weighing mechanism, of price-computing mechanism comprising a rotary member and a member coacting therewith, one of which is inclined, said members being adjustable one relatively to the other transversely to the incline and said incline varying progressively in the direction of adjustment, one of said members being movable past the other to actuate the computing mechanism in accordance with the weight of the article, substantially as described.

8. The combination with weighing mechanism, of price-computing mechanism comprising a rotary actuating member and a member actuated thereby, one of which is inclined, said members being adjustable one relatively to the other transversely to the incline and said incline varying progressively in the direction of adjustment, and connections between a movable part of the weighing mechanism and said actuating member for rotating the latter, substantially as described.

9. The combination with weighing mechanism, of price-computing mechanism comprising a rotary inclined member and a member coacting therewith, said members being adjustable one relatively to the other transversely to the incline, and said incline varying progressively in the direction of adjustment, one of said members being movable past the other to actuate the computing mechanism in accordance with the weight of the article, substantially as described.

10. The combination with weighing mechanism, of price-computing mechanism comprising a rotary inclined member and a member coacting therewith and adjustable transversely to the incline, said incline varying progressively in the direction of adjustment, one of said members being movable past the other to actuate the computing mechanism in accordance with the weight of the article, substantially as described.

11. The combination with weighing mechanism, of price-computing mechanism comprising a rotary inclined actuator and a member actuated thereby, said members being adjustable one relatively to the other transversely to the incline and said incline varying progressively in the direction of adjustment, and connections between a movable part of the weighing mechanism and said actuator for rotating the latter, substantially as described.

12. The combination with weighing mechanism, of price-computing mechanism comprising a rotary inclined actuator, and a member actuated thereby and adjustable transversely to the incline, said incline varying progressively in the direction of adjustment, and connections between a movable part of the weighing mechanism and said actuator for rotating the latter, substantially as described.

13. The combination with a scale-beam and its poise, of price-computing mechanism comprising a rotary member and a member coacting therewith, one of which is inclined, said members being adjustable one relatively to the other transversely to the incline and said incline varying progressively in the direction of adjustment, one of said members being movable past the other by the poise to actuate the computing mechanism, substantially as described.

14. The combination with a scale-beam and its poise, of price-computing mechanism comprising a rotary actuating member and a member actuated thereby, one of which is inclined, said members being adjustable one relatively to the other transversely to the incline, and said incline varying progressively in the direction of adjustment, and connections between the poise and actuating member for rotating the latter, substantially as described.

15. The combination with a scale-beam and its poise, of price-computing mechanism comprising a rotary inclined member and a member coacting therewith, said members being adjustable one relatively to the other transversely to the incline and said incline varying progressively in the direction of adjustment, one of said members being movable past the other by the poise to actuate the computing mechanism, substantially as described.

16. The combination with a scale-beam and its poise, of price-computing mechanism comprising a rotary inclined member, and a member coacting therewith and adjustable transversely to the incline, said incline varying progressively in the direction of adjustment, one of said members being movable past the other by the poise to actuate the computing mechanism, substantially as described.

17. The combination with a scale-beam and its poise, of price-computing mechanism comprising a rotary inclined actuator, and a member actuated thereby, said members being adjustable one relatively to the other transversely to the incline and said incline varying progressively in the direction of adjustment, and connections between the poise and actuator for rotating the latter, substantially as described.

18. The combination with a scale-beam and its poise, of price-computing mechanism comprising a rotary inclined actuator and a member actuated thereby and adjustable transversely to the incline, said incline varying progressively in the direction of adjustment, and connections between the poise and actuator for rotating the latter, substantially as described.

19. The combination with a scale-beam and its poise, of price-computing mechanism comprising a rotary actuating member axially parallel to the beam and a member actuated thereby, one member being inclined concentrically to the axis of the rotary member and the other member adjustable radially thereof, the inclination of the inclined member varying progressively in the direction of adjustment, and connections between the poise and actuating member for rotating the latter, substantially as described.

20. The combination with a scale-beam and its poise, of price-computing mechanism comprising a rotary actuating member axially parallel to the beam and a member actuated thereby, one member being inclined concentrically to the axis of the rotary member and the other member adjustable radially thereof, the inclination of the inclined member varying progressively in the direction of adjustment, and a spiral cam connection between the poise and actuating member for rotating the latter, substantially as described.

21. The combination with a scale-beam and its poise, of price-computing mechanism comprising a concentrically-inclined rotary actuator axially parallel to the beam and a member actuated thereby and adjustable radially thereof, the inclination of the actuator varying progressively in the direction of adjustment, and connections between the poise and actuator for rotating the latter, substantially as described.

22. The combination with a scale-beam and its poise, of price-computing mechanism comprising a concentrically-inclined rotary actuator axially parallel to the beam and a member actuated thereby and adjustable radially thereof, the inclination of the actuator varying progressively in the direction of adjustment, and a spiral cam connection between the poise and actuator for rotating the latter, substantially as described.

23. The combination with a scale-beam and its poise, of price-computing mechanism comprising a rotary concentrically-inclined actuator axially parallel to the beam, a rack actuated thereby and having a part adjustable radially thereof, the inclination of the actuator varying progressively in the direction of adjustment, indicating devices geared to said rack, and connections between the poise and actuator for rotating the latter, substantially as described.

24. The combination with a scale-beam and its poise, of price-computing mechanism comprising a concentrically-inclined rotary actuator axially parallel to the beam, a rack actuated thereby and having a part adjustable radially thereof, the inclination of the actuator varying progressively in the direction of adjustment, indicating devices geared to the rack, and a spiral cam connection between the poise and actuator for rotating the latter, substantially as described.

25. The combination with a beam-scale and its poise, of price-computing mechanism comprising a rotary actuator operated by the poise, a member on the opposite side of the beam-fulcrum actuated thereby and movable thereby to and from said fulcrum, and a compensator movable reversely to said member, substantially as described.

26. The combination with a beam-scale and its poise, of price-computing mechanism comprising a rotary actuator operated by the poise, a rack-bar on the opposite side of the beam-fulcrum and movable thereby to and from said fulcrum; and a compensator rack-bar gearing therewith and movable thereby in the reverse direction, substantially as described.

27. The combination with a scale-beam and its poise, of shaft 41, spiral cam 43 thereon engaged by the poise, inclined member 21, rack-bar 18 and indicating devices geared therewith, substantially as described.

28. The combination with a scale-beam and its poise, of shaft 41, spiral cam 43 thereon engaged by the poise, inclined member 21, rack-bar 18, indicating devices geared therewith, transversely-adjustable bar 27 and means for adjusting it, substantially as described.

29. The combination with a scale, of a beam supporting price-indicating devices on one side of its fulcrum, a poise on the opposite side of the fulcrum, and adjustable connections between the poise and indicating devices for operating the latter in accordance with the weight and unit price of the article weighed, substantially as described.

30. The combination with a scale-beam and its poise, of price-indicating devices mounted on the beam in rear of its fulcrum, and adjustable connections, also mounted on the beam, between the poise and indicating devices for actuating the latter in accordance with the weight and unit price of the article weighed, substantially as described.

31. The combination with a scale-beam and its poise, of price-indicating devices mounted on the beam in rear of its fulcrum, connections, also mounted on the beam, between the poise and indicating devices for actuating the latter and adjusting mechanism also mounted on the beam for regulating the movement of the indicating devices, substantially as described.

32. The combination with a scale-beam and its poise, of price-indicating devices mounted on the beam in rear of its fulcrum, adjustable connections also mounted on the beam between the poise and indicating devices for actuating the latter in accordance with the weight and unit price of the article weighed, and a casing on the beam for inclosing the indicating devices, substantially as described.

In testimony whereof I have hereunto set my hand in the presence of two subscribing witnesses.

FREDERICK L. FULLER.

Witnesses:
T. F. KEHOE,
A. L. KENT.